UNITED STATES PATENT OFFICE.

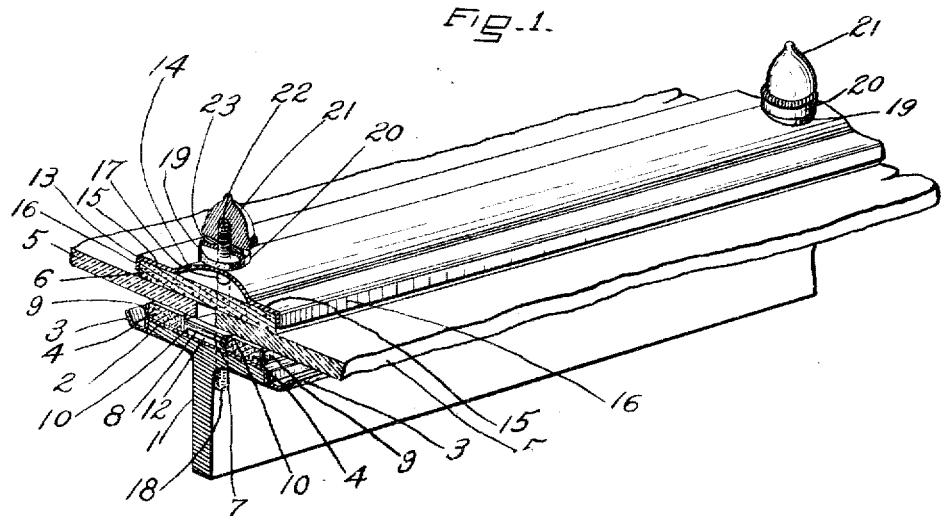
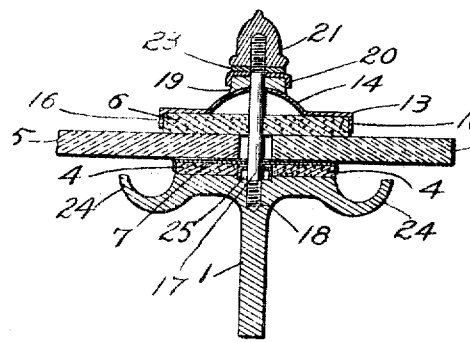
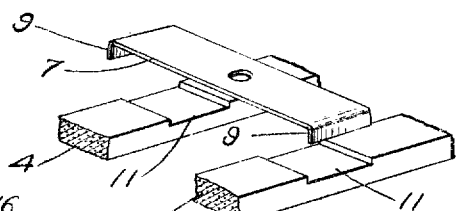
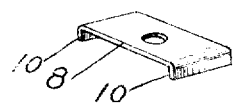
INVENTORS
PERCY L. MOSES AND
HARVEY S. GREENE,
ADMINISTRATOR OF THE ESTATE OF
HAROLD C. GREENE

PERCY L. MOSES, OF BROOKLINE, MASSACHUSETTS, AND HAROLD C. GREENE, DECEASED, LATE OF COHOES, NEW YORK, BY HARVEY S. GREENE, ADMINISTRATOR, OF WATERFORD, NEW YORK; SAID MOSES AND SAID ADMINISTRATOR ASSIGNORS TO ASBESTOS PROTECTED METAL COMPANY, OF PITTSBURGH, PENNSYLVANIA, A CORPORATION OF PENNSYLVANIA.

SKYLIGHT AND GLASS-WALL STRUCTURE.

1,266,613.

Specification of Letters Patent.   Patented May 21, 1918.

Application filed September 4, 1917. Serial No. 189,680.

*To all whom it may concern:*

Be it known that we, PERCY L. MOSES and HAROLD C. GREENE, late a citizen of Cohoes, New York, deceased, by HARVEY S. GREENE, administrator of his estate, citizens of the United States, and residents of Brookline, in the county of Norfolk and State of Massachusetts, and of Waterford, in the county of Albany and State of New York, respectively, have invented certain new and useful Improvements in Skylight and Glass-Wall Structures, of which the following is a specification.

Our invention relates to improvements in skylight and glass wall structures, in which simple and effective means is provided for supporting adjoining panes of glass.

Our improved skylight and glass wall structure is particularly adapted to all forms of skylights, glazed portions of saw-tooth roofs and monitor sash, and its simple construction, durability, compactness and ease with which it may be put together and taken apart, especially for making repairs, render it highly efficient and desirable to use.

In building some forms of skylights and other glass wall structures a support has been generally provided, upon which is a superstructure comprising panes of glass resting upon cork, felt or other suitable material and cushioned above with the same material, and having some means for holding the various parts together. However, while various forms of superstructures for holding the panes of glass and cushions have been devised, many of these devices have disadvantages and our improved skylight and glass wall structure is adapted to overcome many defects in previous devices and in addition it possesses important improvements over similar devices in general use.

The invention has for its object to support the glass panes upon resilient members, which are separate from each other and spaced apart upon a supporting member, yet which are restrained against lateral movement upon said supporting member by spacing means which are detachable from the supporting member, and which for the best results are out of contact with the glass panes.

The particular features of the invention will be pointed out in the claims at the end of this specification.

Corresponding and like parts are referred to in the following description and indicated in all the figures of the drawings by the same reference characters.

In the drawings 1 represents a supporting bar, upon the upper surface of which is a plate 2 provided with condensation gutters 3. Above the plate 2 are resilient cushions 4 of cork or other suitable resilient material in the form of strips. Upon the resilient cushions 4 rest the edges of adjoining panes or plates of glass 5, above which is a layer of resilient insulation 6 of cork or other suitable resilient material. The resilient cushions 4 are held in position by upper and lower spacers 7 and 8 respectively. The upper spacers 7 are provided at each end with downwardly extending portions 9, which are out of contact with the supporting bar 1. The lower spacers 8 are also provided with downwardly extending portions 10, which press the resilient cushions 4 against the downwardly extending portions 9. The resilient cushions 4 are provided with laterally extending grooves 11 adapted to receive the upper spacers 7, so that the upper spacers will be entirely out of contact with the panes of glass. The lower spacers 8, by means of the downwardly extending portions 10, form an interior gutter or channel 12 adapted to act as a means for carrying away any water that may leak through and enter therein.

Above the layer of resilient insulation 6 is a spring tension cap 13 provided with a central raised or dome-shaped portion 14, from the base of which are laterally extending portions 15 parallel to and in contact with the layer of resilient insulation 6, and having also downwardly extending portions 16 inclosing the layer of resilient insulation 6, but out of contact with the panes of glass. The spring tension cap 13 by reason of its structure, having a central raised or dome-shaped portion 14 and laterally extending portions 15, is especially adapted to exert a uniform and constant pressure upon the layer of resilient insulation 6, and forming thereby practically water-tight joints between the layer of resilient insulation 6 and the panes of glass 5, between the panes of glass 5 and the resilient cushions 4, and between the resilient cushions 4 and the supporting bar 1. The spring tension cap 13, the layer of resilient insulation 6, and the upper and lower spacers 7 and 8 are held in position by bolts 17, which are placed at intervals of approximately one foot apart. The lower end 18 of the bolt 17, which may be either straight or tapered, is fastened in a threaded opening in the supporting bar 1.

Upon the dome-shaped portion 14 of the spring tension cap 13 is a resilient washer 19 of cork or other suitable material encircling the bolt 17, which is surmounted by a lead cap 20 inclosing the washer 19, but not in contact with the dome-shaped portion 14 of the spring tension cap 13. A milled lock nut 21, preferably covered, is mounted on the upper threaded end 22 of the bolt 17 and above the lead cap 20, which serves to lock all the coöperating parts together and adapted to originate and control the pressure exerted by the spring tension cap 13 upon the resilient insulation 6. A metal washer 23 is placed between the lock nut 21 and the lead cap 20, so as to protect the lead cap from wear by contact with the lock nut 21.

In Fig. 4 a modification is shown having condensation gutters 24 integral with the supporting bar 1 and having also an interior channel 25 in the supporting bar 1, thereby making the interior gutter of sufficient size to carry away any water that may enter therein.

The supporting bar 1 is attached to the frame or roof in any suitable manner and the condensation gutters 3 and 24 are connected with suitable outlets, as are the interior gutters 12 and 25.

It is evident that in operation the device is well adapted to perform the function for which it is designed. Thus by placing the panes of glass in a superstructure in such a manner that they are held by resilient means at all points of tension, a protection against breakage of glass in consequence of any strain upon the structure or any vibration thereto is provided, which is an important improvement in devices of this kind, as is the use of a spring tension cap of the type described herein especially, used in conjunction with the means for originating and controlling the pressure exerted thereby. Another important feature of the invention is the interior gutter for carrying away any water which may collect therein by condensation or otherwise. One of the great advantages of the invention is the compactness of the device and the ease with which it may be put together and taken apart, while by covering all exposed parts of the resilient insulation, resilient cushions and the resilient washer the durability and effectiveness of the structure is greatly increased.

It is to be understood that our invention is not limited to the specific details of construction shown in the accompanying drawings, but that said details may be varied in the practical carrying out of our invention. It is also to be understood that the combinations specifically set forth in the several claims are intended to be separately claimed without limitation to the use in connection therewith of other features and details of construction illustrated within the scope of the appended claims.

We claim as new and desire to secure by Letters Patent:—

1. A skylight and glass wall structure comprising a supporting member, resilient cushions for adjoining panes of glass provided with laterally extending grooves, and detachable spacers adapted to fit in the said grooves and to hold the said resilient cushions in position on the said supporting member.

2. A skylight and glass wall structure comprising a supporting member, independent resilient cushions sustained by said supporting member and separated from each other, detachable spacers separate from said supporting member and extended transversely of said resilient members and engaged with the latter to prevent movement of the resilient members away from each other, and intermediate spacers separate from the supporting member and interposed between said resilient members to prevent movement of said members toward each other.

3. A skylight and glass wall structure comprising a supporting member, individual cushions sustained thereby for supporting adjacent glass panes thereon, and spacing means detachable from said cushions and supporting member for maintaining the said cushions in fixed relation to one another.

4. A skylight and glass wall structure comprising a supporting member, individual cushions sustained thereby for supporting adjacent glass panes thereon, spacing means detachable from said cushions and supporting member for maintaining the said cushions in fixed relation to one another, a sealing member supported by the said glass panes, a cap member supported by the sealing member, and retaining means extending through said cap member and coöperating with the detachable cushion-spacing means to maintain the latter in fixed relation to the supporting member.

In testimony whereof we have affixed our signatures in the presence of two witnesses.

PERCY L. MOSES.
HARVEY S. GREENE,
*Administrator of the estate of Harold C. Greene, deceased.*

Witnesses for Percy L. Moses:
RAYMOND W. WOOD,
WILLIAM E. FOSTER.

Witnesses for Harvey S. Greene:
HENRY A. STRONG,
GEO. W. ANDREW.